United States Patent [19]

van Lingen

[11] Patent Number: 4,585,032

[45] Date of Patent: Apr. 29, 1986

[54] MOTOR OPERATED TANDEM VALVE ASSEMBLY

[75] Inventor: H. Peter van Lingen, Marlboro, Mass.

[73] Assignee: Asahi/America, Inc., Medford, Mass.

[21] Appl. No.: 671,478

[22] Filed: Nov. 14, 1984

[51] Int. Cl.[4] ............... F16K 11/22; F16K 31/52; F16K 31/04

[52] U.S. Cl. ............... 137/862; 137/870; 251/129.11

[58] Field of Search ............... 137/595, 862, 870; 251/133, 129.11

[56] References Cited

U.S. PATENT DOCUMENTS

| | | | |
|---|---|---|---|
| 1,194,676 | 8/1916 | Slaw | 137/862 X |
| 2,439,539 | 4/1948 | Cellwork | 137/862 X |
| 4,173,328 | 11/1979 | Karbo | 251/309 |
| 4,193,541 | 3/1980 | Scheidweiler | 251/133 X |
| 4,205,783 | 6/1980 | Dietsche et al. | 251/133 X |

FOREIGN PATENT DOCUMENTS 735292 5/1943 Fed. Rep. of Germany ...... 137/862

*Primary Examiner*—Arnold Rosenthal
*Attorney, Agent, or Firm*—Anthony J. Casella; Gerald E. Hespos

[57] ABSTRACT

An assembly is provided for simultaneously operating a plurality of valves. The assembly includes valve stem levers mounted to the valve stems of each of the valves and adapted to rotate with the corresponding valve stems. The valve stem levers are joined to one another by connecting bar assemblies which transmit rotational movement originating in one valve stem lever to the other valve stem levers connected thereto.

3 Claims, 3 Drawing Figures

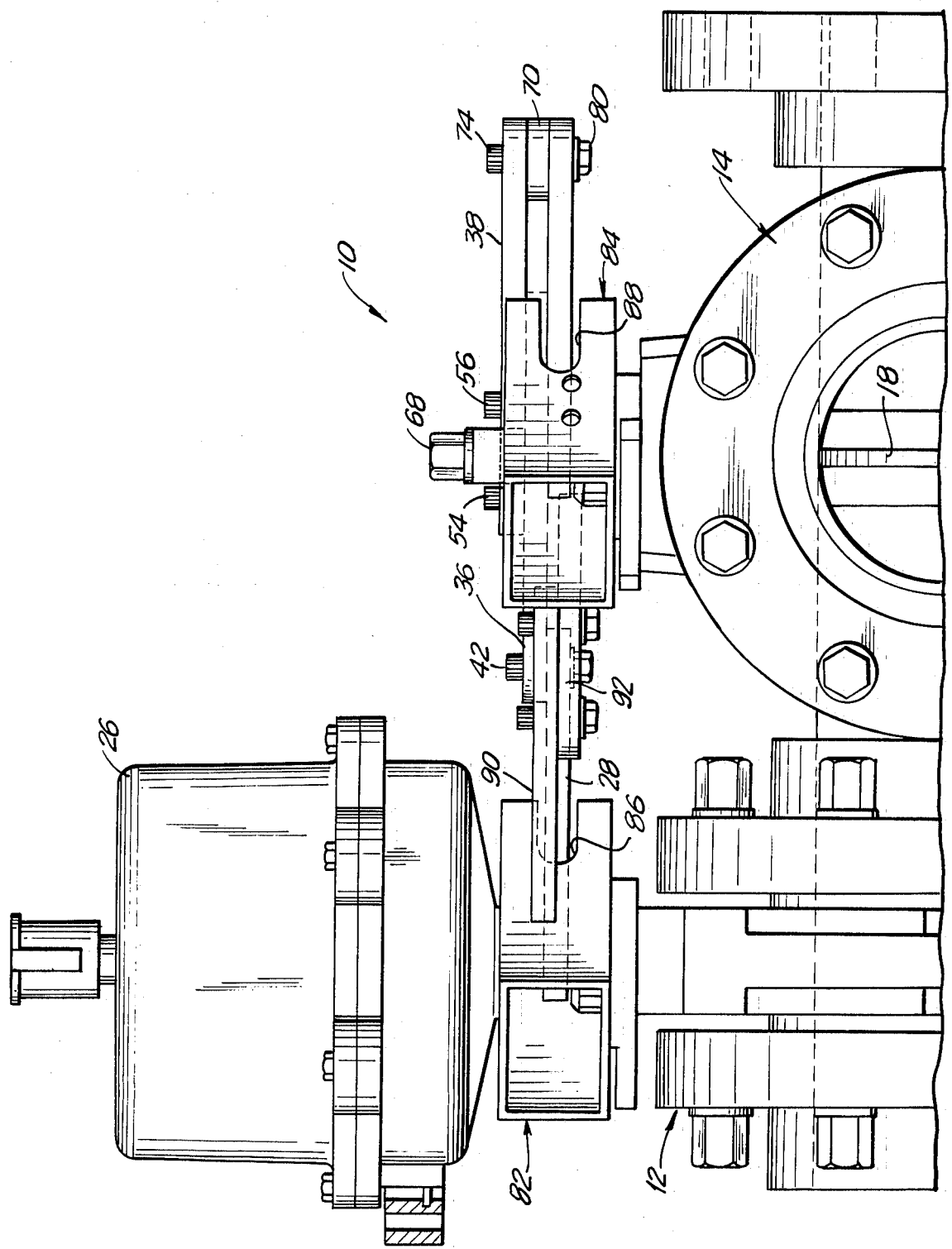

MOTOR OPERATED TANDEM VALVE ASSEMBLY

BACKGROUND OF THE INVENTION

Thermoplastic pipes and valves are employed in a broad range of chemical or chemical engineering systems. Thermal plastic valves and pipes are particularly desirable for systems handling highly corrosive fluids such as acids and other oxidizing chemicals, caustics, solvents and halogens. These corrosive chemicals frequently flow at high temperatures and high pressures (e.g. 150 PSI, 250° F.).

The chemical engineering or chemical processes carried out in these complex systems of thermoplastic valves and pipes invariably depend upon the accurate and timely on and off sequencing of valves throughout the system. For example, it may be necessary to shut off or turn on several lines of a system at the same time. Alternatively, it may be necessary to completely stop fluid flow in one line while simultaneously initiating flow in a different line. An incorrect or incomplete sequencing of such valve operations can have a substantial costly and occasionally hazardous effect.

Ball valves and butterfly valves often are used to carry out this on and off sequencing of fluid flows. Valves of this type typically are positioned to be in either a complete open position or a completely closed position. More particularly, ball valves include a sphere rotationally mounted in the fluid flow path of the valve. The sphere or ball includes a cylindrical passage extending entirely therethrough. This cylindrical passage is aligned such that fluid flow through the valve is substantially umimpeded in one rotational position of the ball, while a 90° rotation of the ball causes a complete blockage of the fluid flow path. Similarly, butterfly valves include a generally circular disc rotationally mounted in the fluid flow path. In one rotational position, the disc permits a substantially unimpeded fluid flow through the valve, while a 90° rotation of the disc completely blocks the fluid flow.

Manually operated valves are quite acceptable in systems having a relatively small number of valves or in systems where the precise sequencing of valve operations is not critical. However, many chemical engineering and chemica systems are extremely complex and include a large number of valves, the precise sequencing of which is very critical. Therefore, many such systems utilize arrays of motor operated valves. These automated valves typically include an electric or pneumatic motor in communication with the valve stem and adapted to rotate the valve stem through substantially precisely 90° of rotation. One such electrically operated valve is shown and described in a copending application entitled MOTOR OPERATED VALVE by H. Peter van Lingen, Ser. No. 671,485 filed 11-11-84, now U.S. Pat. No. 4,556,194, issued 12-3-84, of which is incorporated herein by reference.

Although the above described automated valves generally can be quite efficient, they also tend to be costly. The cost of such valves can become significant in complex systems requiring many such valves.

In view of the above it is an object of the subject invention to provide an assembly for efficiently operating a plurality of valves in a fluid flow system.

It is an additional object of the subject invention to provide an assembly wherein the operation of one valve can cause the simultaneous operation of at least one other valve.

It is still another object of the subject invention to provide an assembly including a motor for simultaneously operating a plurality of valves.

SUMMARY OF THE INVENTION

The subject invention is directed to a valve actuator assembly for use with a plurality of valves in a fluid flow system. The assembly of the subject invention is particularly well adapted for use with thermoplastic ball or butterfly valves used in chemical engineering or chemical systems which carefully control the flow of highly corrosive chemicals.

The assembly of the subject invention includes a motor means mounted to the valve stem of a valve in a system of valves. The motor means is connected to a source of power, such that upon activation the motor means will rotate the valve stem. The rotation of the valve stem caused by operation of the motor means in turn causes the rotation of a restriction means, such as a ball or butterfly valve disc within the valve. In this manner, the activation of the motor means can either prevent or permit the flow of fluid through the valve. Preferably, the motor means is operative to cause the valve stem to rotate through an angle of precisely 90°. This 90° rotation will enable an accurate mode change of a ball or butterfly valve from a completely opened condition to a completely closed condition, or the reverse. It also is preferred that the motor means is operative to cause alternate rotations of the valve stem to be in opposite directions. Thus, in a preferred embodiment as described herein, one activation of the motor means will cause the valve stem to rotate 90° in a clockwise direction, while the next activation of the motor means will cause the valve stem to rotate 90° in a counterclockwise direction. As explained further below, this can be accomplished by employing a reversible motor with an appropriate alternator switch means.

The assembly of the subject invention further includes means which connect the valve stem of the first valve to valve stems of at least one other valve. In one embodiment, valve stem leves are securely mounted to the valve stems of the first valve, as well as the valve stems of at least one other valve. More particularly, the valve stem levers are affixed to the associated valve stem, such that each rotation of the valve stem causes an equivalent rotation of its valve stem lever.

The valve stem levers are connected to one another by a rigid connecting assembly. Thus, the rotational movement of the valve stem and valve stem lever on the first valve will be transmitted through the rigid connecting assembly to cause a simultaneous and substantially equivalent rotation of the valve stem levers and valve stems of the other valves. This rotation of the valve stems of the other valves causes an appropriate movement of the ball or disc in such valve. Preferably, the rigid connecting assembly is of adjustable length to facilitate the connection of the assembly. It also is preferred that a stationary support member extend between adjacent valves to insure that only rotational movement is effected through the valve stem levers and connecting assembly.

The specific operation and effect of the subject assembly is dependent upon the initial disposition of the restriction means in each valve at the time the valve stem levers are mounted. Thus, depending upon this initial disposition, the subject assembly can be operative to cause the simultaneous opening of a plurality of valves or the simultaneous closing thereof. Alternatively, the subject assembly also could be operative to open at least one valve and to close at least one other valve at the same time.

BRIEF DESCRIPTION OF THE DRAWINGS

FIG. 3 is a side elevational view of the assembly shown in FIG. 2.

DETAILED DESCRIPTION OF THE PREFERRED EMBODIMENT

Figure 1:
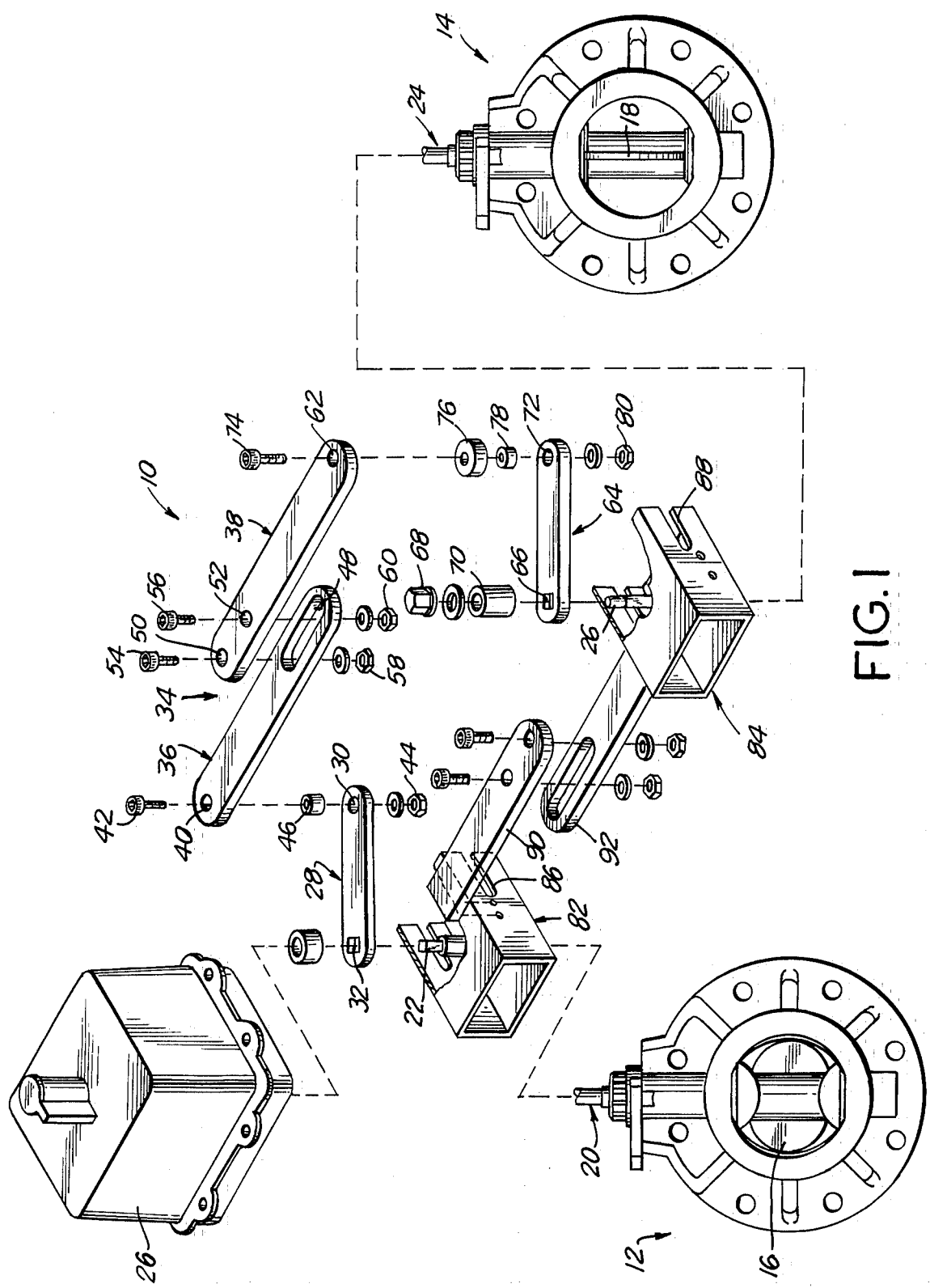
FIG. 1 is an exploded perspective view of the assembly of the subject invention with a pair of valves.

The assembly of the subject invention is indicated generally by the numeral 10 in FIG. 1 and is illustrated as used with valves 12 and 14. As explained above, the assembly 10 can readily be expanded to enable the simultaneous operation of more than two valves as well.

The valves 12 and 14 are provided with discs 16 and 18 rotationally mounted therein. Disc 16 in valve 12 is rotationally disposed to block the flow of fluid through valve 12. On the other hand, disc 18 in the valve 14 is rotationally disposed to permit fluid flow through valve 14. Although the valves 12 and 14 are depicted as being in opposite operational modes, it is possible to employ assembly 10 such that the valves connected thereto will all be in the same open or closed position.

Disc 16 of valve 12 is in communication with a valve stem 20 which extends through the body of valve 12 and transmits the torque which rotationally moves the disc 16 within valve 12. The valve stem 20 terminates in a non-circular end 22 which facilitates the rotation of the valve. In a similar manner disc 18 is mounted to valve stem 24 which includes a non-circular end 26.

A motor is in communication with the valve stem 20 of valve 12. The motor can be either electrically or pneumatically operated and provides the power for directly and positively rotating valve stem 20 and the disc 16. More particularly the motor 26 is operative to rotate the valve stem 20 and disc 16 precisely 90°. The motor 26 also is operative to rotate in opposite directions on alternate activations. Thus, for example, the motor 26 may be provided with an alternator switching means which causes the valve stem 20 to rotate in a clockwise direction to open the valve 12 in response to a first signal, and then which subsequently causes the valve stem 20 to rotate in a counterclockwise direction to close the valve 12 in response to a second signal.

A first valve stem lever 28 is securely mounted to the end 22 of valve stem 20 and is aligned generally perpendicularly thereto. More particularly, the first valve stem lever 28 defines an elongated generally planar rigid bar having a circular aperture 30 in one end thereof and a non-circular aperture 32 in the opposed end. The non-circular aperture 32 is configured and dimensioned to be non-rotationally mounted on end 22 of valve stem 20. As a result, rotational movement of valve stem 20 caused by the motor 26 will generate a simultaneous rotational movement of the valve stem lever 28 about the non-circular aperture 32.

A rigid connecting bar assembly 34 is rotationally mounted to the first valve stem lever 28 at aperture 30 thereof. The connecting bar assembly 34 includes first and second elongated rigid generally flat connecting bars 36 and 38 respectively. The first connecting bar 36 includes a circular aperture 40 extending through one thereof. A bolt 42 extends through circular apertures 40 of connecting bar 36 and through circular aperture 30 on valve stem lever 28. Bolt 42 is connected thereto by nut 44. A bushing 46 is mounted on the bolt 42 intermediate the first valve stem lever 28 and the first connecting bar 36. The bushing 46 facilitates rotational movement between the first connecting bar 36 and the first valve stem lever 28.

The end of the first connecting bar 36 opposite aperture 40 includes a longitudinally extending slot 48 extending therethrough. The slot 48 facilitates adjustments to the length of the connecting bar assembly 34 as explained herein.

The second connecting bar 38 is of generally the same configuration as the first connecting bar 36. However, the second connecting bar 38 includes a pair of longitudinally aligned apertures 50 and 52 adjacent one end thereof. Bolts 54 and 56 extend through apertures 50 and 52 respectively of second connecting bar 38 and through the slot 48 in the first connecting bar 36. Nuts 58 and 60 are threadably mounted on bolts 54 and 56 thereby rigidly securing the first and second connecting bars 36 and 38 to one another to define the connecting bar assembly 34. The length of the connecting bar assembly can be adjusted by longitudinally moving apertures 50 and 52 relative to the slot 48.

The end of the second connecting bar 38 opposite apertures 50 and 52 is provided with circular aperture 62. The aperture 62, as explained below, enables the communication of the connecting bar assembly 34 to the valve stem 24 of the valve 14.

A second valve stem lever 64 is provided for connecting valve stem 24 to the connecting bar assembly 34. The second valve stem lever 64 is substantially the same as the first valve stem lever 28. More particularly, the second valve stem lever 64 includes a non-circular aperture 66 adjacent one end thereof and adapted to be non-rotationally mounted on the end 26 on the valve stem 24 and perpendicular thereto. This mounting of the second valve stem lever 64 is accomplished with a threaded nut 68 adapted to be secured to the end 26 of valve stem 24. Additionally, a bushing 70 is provided to prevent the nut 68 from loosening as the valve stem 24 rotates. As a result of this construction, the second valve stem lever 64 and the valve stem 24 will undergo simultaneous rotational movement in response to appropriate forces on either member. The end of the second valve stem lever 64 opposite the aperture 66 is provided with a circular aperture 72. A bolt 74 extends through apertures 62 in the second connecting bar 38 and through aperture 72 in the second valve stem lever 64. Bushings 76 and 78 are securely mounted on bolt 74 and disposed intermediate the second connecting bar 38 and the second valve stem lever 64. The bolt 74 is secured in this position by nut 80, while the bushings permit relative rotational movement between the second connecting bar 38 and the second valve stem lever 64. The distance between apertures 66 and 72 on the second valve stem lever 64 is substantially equal to the distance between apertures 30 and 32 on the first valve stem lever 28. These equal distances will insure that a rotation of either valve stem lever 28 or 64 will cause an equivalent angular rotation in the other valve stem lever.

Housings 82 and 84 are securely mounted to valves 12 and 14 substantially surround the respective connections of valve stems 20 and 24 to valve stem levers 28 and 64. The housings 82 and 84 are provided with slots 86 and 88 respectively through which the first and second valve stem levers 28 and 64 may rotate. Support members 90 and 92 are securely mounted to the housings 82 and 84 respectively, and are securely but adjustably connected to one another. The support members 90 and 92 insure that forces generated by the motor 26 will be transmitted only through the valve stem levers 28 and 64 and the connecting bar assembly 34, and will not result in any undesired forces being generated in either valve 12 or 14.

Figure 2:
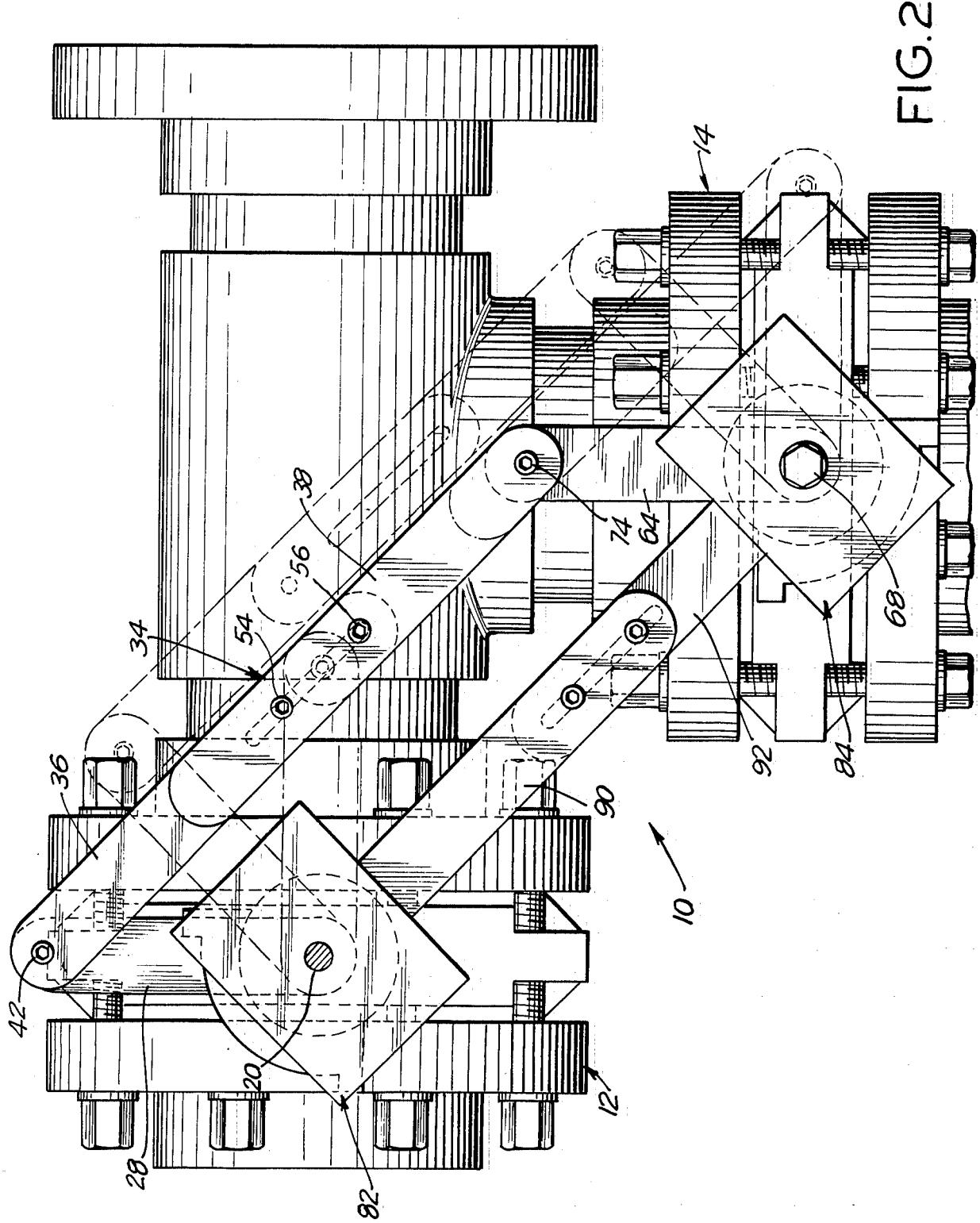
FIG. 2 is a top elevational view of the assembly of the subject invention.

In a typical operation, as illustrated best by FIGS. 2 and 3, an external signal will initiate the operation of the motor 26. As a result, the valve stem 20 and valve disc 16 will be rotated about their common axis. As the valve stem 20 rotates about its axis, the non-circular end 22 thereof will cause the simultaneous rotation of the valve stem lever 28. Movement of the valve stem lever 28 will exert a force upon the connecting bar assembly 34 through the interconnection at bolt 42. The force on the connecting bar assembly 34 then will be transmitted to the second valve stem lever 64 through the connection at bolt 74. As a result of this force, the second valve stem lever 64 and the valve stem 24 attached thereto are urged into rotational motion. Thus, the rotation of the valve stem 20 caused by motor 26 is transmitted through the first and second valve stem levers 28 and 64 and the connecting bar assembly 34 to cause a corresponding rotation in the valve stem 24. In view of the fact that the distance between apertures 30 and 32 on the first valve stem lever 28 is equal to the distance between apertures 66 and 72 on the second valve stem lever 64, the first and second valve stem levers 28 and 64 will rotate through precisely the same angle as illustrated most clearly in FIG. 2. Therefore a 90° rotation of valve stem 20 caused by the action of motor 26, will cause an equivalent 90° rotation of valve stem 24.

FIG. 1 illustrates valves 12 and 14 being in opposite opened/closed modes. Therefore, a 90° rotation of valve stem 20 will place disc 16 in the open condition. This rotational movement of valve stem 20 will be transmitted through the valve stem levers 28 and 64 and the connecting bar assembly 34 to rotate disc 18 into the closed condition. Thus, valves 12 and 14 will continue to be in opposite opened/closed conditions relative to one another. However, the assembly 10 can be mounted to valves 12 and 14 such that the butterfly valve discs 16 and 18 open and close in unison.

In summary, an assembly is provided for simultaneously controlling the operation of a plurality of valves. The assembly includes valve stem levers mounted to each of the valves. The valve stem levers are of substantially equal length and are adapted to rotate with the respective valve stems. The valve stem levers are joined to one another by a connecting bar assembly that will transmit rotational movement from one valve stem lever to the other. One valve joined to the subject assembly preferably is in communication with a motor adapted to selectively rotate the corresponding valve stem. The rotational movement caused by the motor is transmitted through the associated valve stem lever and the connecting bar assembly to cause a corresponding and equal rotational movement in the other valve stem levers and valve stems.

While the invention has been described with respect to a preferred embodiment, it is obvious that various changes and modifications can be made therein without departing from the spirit of the present invention. Specifically, it should be noted that the assembly shown herein can readily be expanded to encompass more than two valves even though the assembly illustrated herein has been applied to only two valves.

What is claimed is:

1. An assembly for simultaneously operating first and second thermoplastic valves, each said valve including a valve stem rotationally mounted in said valve and fixedly connected to restriction means for selectively blocking or permitting the flow of fluid through the corresponding valve, said assembly comprising:

first and second substantially identical elongated valve stem levers fixedly mounted perpendicularly to the valve stems of said first and second valves respectively;

a rigid elongated connecting bar assembly having opposed ends pivotally connected respectively to said first and second valve stem levers;

first and second housings securely mounted to said first and second valves respectively, said first and second housings being dimensioned and located to at least partly enclose the connection of the first and second valves stem levers respectively to their associated valve stems, said first and second housings including a slot through which the first and second valve stem levers respectively rotate, said slot being dimensioned to define the rotational limits of said first and second valve stem levers; and a support rigidly and non-rotationally mounted to both said first and second housings and extending therebetween, whereby rotation of the valve stem and valve stem lever of the first valve causes the connecting bar assembly to effect an equal rotation of the valve stem lever and valve stem of the second valve, and whereby the support limits the movement in the second valve to the valve.

2. An assembly as in claim 1 further including a motor mounted to and operative to rotate the valve stem of said first valve.

3. An assembly as in claim 1 wherein said connecting bar assembly comprises first and second connecting bars securely but adjustably mounted to one another, said first connecting bar being pivotally mounted to said first valve stem lever and said second connecting bar being pivotally mounted to said second valve stem lever.

* * * * *